United States Patent [19]

Lechevin

[11] 3,867,546

[45] Feb. 18, 1975

[54] NOVEL RODENTICIDES COMPOSITIONS

[75] Inventor: Jean-Claude Lechevin, Lyon, France

[73] Assignee: Lipha, Lyonnaise Industrielle Pharmaceutique, Lyon, France

[22] Filed: June 7, 1972

[21] Appl. No.: 260,512

[30] Foreign Application Priority Data

June 10, 1971 France .............................. 71.21011

[52] U.S. Cl...................... 424/331, 424/17, 424/281
[51] Int. Cl. ............................ A01n 9/28, A01n 17/4
[58] Field of Search....................... 424/17, 281, 331

[56] References Cited
UNITED STATES PATENTS

| | | | |
|---|---|---|---|
| 2,952,689 | 9/1960 | Enders et al..................... | 424/281 X |
| 3,113,071 | 12/1963 | Derse et al........................ | 424/17 X |
| 3,258,396 | 6/1966 | Schaar.................................. | 424/17 |

FOREIGN PATENTS OR APPLICATIONS

| | | | |
|---|---|---|---|
| 1,082,772 | 9/1967 | Great Britain...................... | 424/281 |

OTHER PUBLICATIONS

"Carbowax," Compounds and Polyethylene Glycols; received by U.S. Patent Office 1946, pages 3 and 4.

*Primary Examiner*—Albert T. Meyers
*Assistant Examiner*—Allen J. Robinson
*Attorney, Agent, or Firm*—Browdy and Neimark

[57] ABSTRACT

The invention relates to novel rodenticides compositions. The said rodenticide compositions are constituted by solutions in polyoxyethylene glycols of an anti-coagulant substance such as 2-diphenylacetyl-1,3 indandione; 2 - ($\alpha$- p-chlorophenyl - $\alpha$ -phenylacetyl) - 1,3- indandione; 3- - ($\alpha$ (3 - oxo - 2' - phenyl) butyl] - 4 - hydroxycoumarin or 3 - [(3' - oxo- 2', p -chlorophenyl) butyl] - 4 - hydroxycoumarin.

The aqueous dilutions of these solutions may be offered as toxic beverages for the rodents, and they may be atomized on plants consumed by the rodents, and on any powder and absorbent substance capable of constituting a "run" poison.

8 Claims, No Drawings

NOVEL RODENTICIDES COMPOSITIONS

The present invention relates to novel raticidal-activity compositions the purpose of which it is to destroy rodents such as rats, mice and the like.

It is known that several derivatives of the indandiones-1,3 and of the 4- hydroxycoumarins have the property that they reduce the blood prothrombin level, and are thus suitable for use as raticides, since they produce a high mortality in rodents due to internal hemorrhages. Most frequently, the anticoagulant substance is mixed with a substrate or support material which is consumable by the rodents, for example cereals.

It has been found that an anticoagulant substance such as 2- diphenyl acetyl - 1,3 - indandione - (the common name being diphacinone) ; 2 - ($\alpha$ - p - chlorophenyl -$\alpha$, phenylacetyl) - 1,3 - indandione ; (chlorodiphacinone) 3 - [(3' oxo - 2' - phenyl ) butyl] - 4 - hydroxycoumarin and 3 - [(oxo-2', p-chlorophenyl) butyl] - 4 - hydroxycoumarin has an adequate degree of solubility in polyoxyethylene glycols to permit the preparation of solutions which are stable in time, at levels which may attain 15 g/kg.

Preferably, the anticoagulant substance concentration ranges between 0.01 g and 15 g/kg.

The solutions in polyoxyethylene glycols are chemically stable. They may be colored with water-soluble coloring agents and they may, if necessary, be aromatized.

The aqueous dilutions of these solutions may be offered as toxic beverages to the rats and may be atomized on plants or portions of plants which are habitually consumed by the rodents, and on any powder and absorbent substance capable of constituting a "run" poison. These aqueous dilutions permit the preparation by impregnation of a bait based on cereals, such as wheat, maize, barley, etc., or any other "support" material consumed by the rodents, such as potatoes, carrots, etc.

These dilutions and poisonous baits are particularly appetizing.

Hereinbelow there are given some examples of preparation of the novel rodenticide compositions, illustrating the invention by way of non-limitative example.

EXAMPLE 1.

Preparation of a concentrated solution (so-called "concentrate").

12.5 g of 2 - ($\alpha$ - p - chlorophenyl, phenylacetyl) - 1,3 - indandione (F = 139° - 143°C) are hot-solubilized at a temperature close to 85°C in 987.5 g of polyoxyethylene glycol 300. After cooling, there is obtained a solution containing 12.5 g/kg of chlorodiphacinone.

EXAMPLE 2.

Preparation of a diluted solution ready for use as a toxic beverage for rodents.

The preceding "concentrate" is diluted at the rate of 4g in ordinary water, the quantity being sufficient to obtain a liter solution.

The raticidal activity of this diluted solution has been verified on batches of 20 adult white rats. All the rats which received this solution, as a drink, were dead in less than 8 days.

EXAMPLE 3 — PREPARATION OF POISONED WHEAT.

There are mixed :

| | |
|---|---|
| the "concentrate" (according to Example 1) | 4 g |
| ordinary water | 100 g |
| wheat | 1000 g. |

What I claim is:

1. A rodenticidal composition comprising a solution of 2-($\alpha$-p-chlorophenyl-$\alpha$-phenylacetyl)-1,3-indandione at a concentration from 0.01 to 15 g per kg of solution in polyoxyethylene glycol 300.

2. The rodenticidal composition in accordance with claim 1 wherein said concentration is about 12.5 g/kg.

3. A rodenticidal bait comprising a support material consumable by rodents wherein said support material is wheat, maize, barley, potatoes or carrots and a rodenticidally effective amount of the composition in accordance with claim 1.

4. The rodenticidal bait in accordance with claim 3 wherein said rodenticidal amount is about 4 g./kg of support.

5. A toxic beverage for rodents comprising a solution in water of a rodenticidally effective amount of the composition in accordance with claim 1.

6. The toxic beverage for rodents in accordance with claim 5 wherein said composition is present in said solution at a concentration of about 4 grams per liter.

7. A method of killing rodents comprising positioning in an area where rodents assemble the rodenticidal bait in accordance with claim 3.

8. A method of killing rodents comprising positioning in an area where rodents assemble the toxic beverage in accordance with claim 5.

* * * * *

UNITED STATES PATENT OFFICE
CERTIFICATE OF CORRECTION

PATENT NO. : 3,867,546
DATED : February 18, 1975
INVENTOR(S) : Jean-Claude LECHEVIN It is certified that error appears in the above-identified patent and that said Letters Patent are hereby corrected as shown below:

[57] ABSTRACT, line 6, delete "3--(α(3-oxo-2'-phenyl) butyl]" and insert --3-[(3-oxo-2'-phenyl) butyl]--

Column 2, line 9, after "liter" insert --of--.

Signed and sealed this 27th day of May 1975.

(SEAL)
Attest:

RUTH C. MASON
Attesting Officer

C. MARSHALL DANN
Commissioner of Patents
and Trademarks